US006661926B1

(12) United States Patent
Thoreau et al.

(10) Patent No.: US 6,661,926 B1
(45) Date of Patent: Dec. 9, 2003

(54) PICTURE COMPRESSION PROCESS, ESPECIALLY OF THE MPEG2 TYPE

(75) Inventors: Dominique Thoreau, Cesson Sévigné (FR); Pierre Ruellou, Domloup (FR)

(73) Assignee: Thomson Licensing S.A., Boulogne Cedex (FR)

( * ) Notice: Subject to any disclaimer, the term of this patent is extended or adjusted under 35 U.S.C. 154(b) by 593 days.

(21) Appl. No.: 09/595,738

(22) Filed: Jun. 16, 2000

(30) Foreign Application Priority Data

Jun. 18, 1999 (FR) .............................. 99 07715
Jun. 18, 1999 (FR) .............................. 99 07714

(51) Int. Cl.[7] ............................... G06K 9/36
(52) U.S. Cl. ................................ 382/239
(58) Field of Search ............... 382/232, 236, 382/238, 240, 242, 248, 250; 348/384.1, 394.1–395.1, 400.1–404.1, 407.1–416.1, 420.1–421.1, 425.2, 430.1–431.1; 375/240.02–240.03, 240.11–240.16, 240.18–240.25; 708/203, 300, 307–308, 313, 316–317, 400–405

(56) References Cited

U.S. PATENT DOCUMENTS

| 5,412,431 A | * | 5/1995 | Vogel ...................... 348/405.1 |
| 5,557,420 A | * | 9/1996 | Yanagihara et al. ........ 358/335 |
| 5,559,722 A | | 9/1996 | Nickerson ................ 364/514 R |
| 5,682,204 A | * | 10/1997 | Uz et al. .................. 348/409.1 |
| 5,699,119 A | * | 12/1997 | Chung et al. ............. 348/405.1 |

(List continued on next page.)

FOREIGN PATENT DOCUMENTS

| EP | 0562787 A2 | 9/1993 | ............. H04N/7/13 |

OTHER PUBLICATIONS

Weigand, et al., *Efficient Mode Selection for Block–Based Motion Compensated Video Coding*, Proceedings of the International Confewrence on Image Processing (ICIP, US, Los Alamitos, IEEE Comp. Soc. Press, 1995, pp. 559–562, XP000624030 ISBN: 0–7803–3122–2.

Sun, et al.,*MPEG Coding Performance Improvement by Jointly Optimizing Coding Mode Decisions and Rate Control*, IEEE Transactions on Circuits and Systems for Video Technology, US, IEEE Inc. New York, vol. 7, No. 3, Jun. 1, 1997, pp. 449–458 XP000690583.

List of References Preliminary Search Report Priority Documents.

*Primary Examiner*—Jose L. Couso
(74) *Attorney, Agent, or Firm*—Joseph S. Tripoli; Ronald H. Kurdyla; Guy H. Eriksen

(57) ABSTRACT

A picture compression process, especially of the MPEG2 type, in which each picture macroblock (10) is subjected to a coding chosen, for each macroblock, from among several types of coding. In order to select the type of coding to be applied to the macroblock, the parameter MB_activ-α_Q, is determined, in which $$MB\_activ = \sum_{4luma\ blocks} Block\_activ$$

and $$block\_active = MAX\left(\underset{i,j=0}{\overset{i=6,j=7}{Max}} |x(i,j) - x(i+1,j)|, \underset{i,j=0}{\overset{i=7,j=6}{MAX}} |x(i,j) - x(i,j+1)|\right),$$

wherein Q is the quantization interval, and α is a predetermined parameter, for example equal to 1. The mode of coding selected is that corresponding to a minimum value of the parameter MB_activ-α_Q.

22 Claims, 3 Drawing Sheets

U.S. PATENT DOCUMENTS

| | | | |
|---|---|---|---|
| 5,737,537 A | 4/1998 | Gardos et al. | 395/200.77 |
| 5,771,316 A | 6/1998 | Uz | 382/239 |
| 5,878,166 A * | 3/1999 | Legall | 382/232 |
| 5,933,194 A * | 8/1999 | Kim et al. | 348/403.1 |
| 5,995,237 A * | 11/1999 | Hong | 358/261.2 |
| 6,005,980 A * | 12/1999 | Eifrig et al. | 382/236 |
| 6,072,831 A * | 6/2000 | Chen | 375/240 |
| 6,147,627 A * | 11/2000 | Vogel | 341/50 |
| 6,278,735 B1 * | 8/2001 | Mohsenian | 375/240 |
| 6,408,029 B1 * | 6/2002 | McVeigh et al. | 375/240.13 |
| 6,501,796 B1 * | 12/2002 | Dusseux et al. | 375/240.12 |

* cited by examiner

PICTURE COMPRESSION PROCESS, ESPECIALLY OF THE MPEG2 TYPE

FIELD OF THE INVENTION

The invention concerns a picture compression process in which each picture or picture macroblock is subjected to a coding chosen from among several types of coding.

It relates more particularly to the MPEG2 compression process. Although the invention is not limited to this type of compression, in the description hereafter, we shall refer mainly to this type.

BACKGROUND OF THE INVENTION

Recalled below is the principle of such compression and, at this juncture, the coding types which must be selected for each macroblock will be indicated.

In the MPEG2 standard, it is possible to start from a picture containing in progressive mode 576 rows of 720 points each. In interlaced mode, this picture is composed of two frames each of which comprises 288 rows, also of 720 points each.

Each picture is split up into macroblocks, each of which is formed by a square of 16×16 luminance points. Each macroblock is thus formed of 4 square blocks of 8×8 luminance points. With each of these 4 luminance blocks there are associated (in the 4.2.0 format) two chrominance blocks each of which has 8×8 points, one of the blocks representing the colour difference or red chrominance signal Cr and the other block representing the colour difference or blue chrominance signal Cb. In the 4.2.2 format, with each luminance macroblock there are associated four 8×8 chrominance blocks, 2 blocks for the blue chrominance and 2 blocks for the red chrominance. There is also a 4.4.4 format in which each of the luminance and chrominance components comprises 4 blocks of 8×8.

Represented in FIG. 1 are four 8×8 luminance blocks, with reference 10 within the set and 8×8 chrominance blocks 12 and 14 for the blue and red chrominances respectively, the set illustrating a macroblock in the 4.2.0 norm.

Each block is coded by using a transformation denoted DCT which is a discrete cosine transformation which makes it possible to transform a luminance or chrominance block into a block of coefficients representing spatial frequencies. As may be seen in FIG. 2, a source block 16 is transformed into a block 18 of 8×8 coefficients. The upper left corner 20 of the block 18 corresponds to the zero spatial frequencies (mean luminance value of the block) and, onwards of this origin 20, the horizontal frequencies increase towards the right, as represented by the arrow 22, while the vertical spatial frequencies increase from top to bottom, as represented by the arrow 24.

For each macroblock, it is necessary to choose the coding type: either "intra" or "inter". Intra-coding consists in applying the DCT transformation to a source block of the picture, while inter-coding consists in applying the DCT transformation to a block representing the difference between a source block and a predicted block, or prediction block, of a preceding or following picture.

The choice depends in part on the type of pictures to which the macroblock belongs. These pictures are of three types: the first type is the so-called I or intra type, for which the coding is intra for all the macroblocks.

The second type is of P or prediction type; in pictures of this type, the coding of each macroblock can be either intra or inter. In the case of inter-coding of a macroblock of a picture of P type, the DCT transformation is applied to the difference between the current macroblock of this picture P and a prediction macroblock arising from the preceding I or P picture.

The third type of picture is called B or bidirectional. Each macroblock of such a picture type is either intra-coded or inter-coded. Inter-coding consists also in applying the transformation to the difference between the current macroblock of this B picture and a prediction macroblock. This prediction macroblock may arise either from the preceding picture or from the following picture or from both at once (bidirectional prediction), it being possible for the so-called preceding or following prediction pictures to be of I or P type only.

Represented in FIG. 3 is a set of pictures forming a group called a GOP (Group Of Pictures) which comprises twelve pictures, namely an I picture followed by eleven B and P pictures according to the following succession: B, B, P, B, B, P, B, B, P, B, B.

In the case of predicted pictures (that is to say those deduced from other pictures), motion estimation followed by motion compensation are applied to the macroblock to be coded. This is because, between two pictures, the macroblock may be situated at different locations by reason of the inter-picture and inter-frame motions. The effect of motion compensation is to compute the prediction macroblock according to a given mode of interpolation (commonly called the prediction mode); this macroblock will actually serve as prediction for the current macroblock in inter-picture mode for a given coding mode. Hereinafter, this prediction macroblock and, by the same token this coding mode, will be retained or rejected depending on the decisions taken within the procedure for computing the choice of the coding mode.

Moreover, in the case of interlaced scanning, for which each picture is formed of two successive frames, an odd frame and an even frame, it is necessary to determine whether the DCT transformation should be performed progressively or individually on each frame. This is because, depending on the motion of the picture or the structure of this picture, the result of the coding may be different depending on whether the transformation is performed on the picture or on each frame.

This choice is represented by FIGS. 4a and 4b. Represented in FIG. 4a is a macroblock 28 of an interlaced picture formed of rows $30_1, 30_3, \ldots 30_{15}$ of an odd frame and of rows $30_2, 30_4, \ldots, 30_{16}$ of an even frame. FIG. 4a corresponds to a DCT transformation performed on the picture; each of the four blocks of the macroblock 28 is transformed without rearranging the rows. Thus, the coding is performed on the four blocks $28_1, 28_2, 28_3, 28_4$ forming the macroblock 28 and the transformation is performed on rows $30_1$ to $30_8$ for blocks $28_1$ and $28_2$ and on rows $30_9$ to $30_{16}$ for blocks $28_3$ and $28_4$.

On the other hand, FIG. 4b represents a transformation performed separately for the odd and even frames. Blocks $32_1$ and $32_2$ correspond to the odd frame and blocks $32_3$ and $32_4$ to the even frame. Thus, block $32_1$ comprises rows $30_1, 30_3, \ldots, 30_{15}$, while blocks $32_3$ and $32_4$ comprise rows $30_2, 30_4, \ldots, 30_{16}$.

Represented in FIG. 5 is a chart in block form representing the various operations to be performed in respect of the picture compression or video compression. Each digitized picture is applied to an input of a facility 40 which performs the separation into 8×8 blocks and these 8×8 blocks are transmitted to a facility 42 for selecting between the intra-coding and the inter-coding. If the coding chosen is intra, the block is transmitted to the DCT transformation facility 44. If the coding is inter, the block is subjected to a subtraction by a subtractor facility 46 which takes the differences between the block itself and a prediction block delivered by a time prediction facility 48.

After the DCT transformation 44, a quantization 50 is performed and the quantized coefficients thus obtained are coded according to a VLC coding of variable or fixed length 52. The coefficients thus coded obtained at the output of the coder 52 are directed to a buffer memory 54 whose output constitutes the coding output 56. To avoid saturation and drying up of the buffer memory 54, regulation 60 is performed which modifies the quantization 50.

To be able to perform the time prediction, the output of the quantization facility 50 is linked to the input of a facility 62 for inverse quantization $Q^{-1}$ whose output is applied to the input of a facility 64 performing the inverse cosine transformation $DCT^{-1}$. The output of the facility 64 is transmitted directly to a picture memory 66 when the coding of the block is intra, as determined by a facility 68. On the other hand, when the facility 68 decides that the coding is inter, the output of the block 64 is added, by virtue of an adder 70, to the prediction macroblock delivered by the facility 48 and it is the output from the adder 70 which is transmitted to the picture memory 66. The memory 66 keeps decoded pictures.

The inter-picture and inter-frame motions are estimated by a facility 72 which receives, on the one hand, information from the picture memory 66 and, on the other hand, from the output from the facility 40 for constructing blocks. Thus, it may be seen that the time prediction 48 is performed, on the one hand, on the basis of the picture memory 66 and, on the other hand, of the motion estimation 72.

The computation of the coding or binary train 52 depends, among other things, on the motion vectors arising from the motion estimation 72, the coded DCT coefficients, the headers of the macroblocks, and MPEG2 coding information delivered by a facility 74. This information relates to the MPEG2 signalling cues, namely the headers of the rows of macroblocks (or "slices"), the headers of the pictures of the GOPs and the headers of the sequence to be coded.

For the pictures of I type, the coding must be chosen between frame-wise intra-coding or picture-wise intra-coding. This choice is made on the basis of an analysis of the activity contained in the macroblock; it gives good results in general.

For the pictures of P type and the pictures of B type, the number of decisions to be made is substantially larger.

Thus, a P macroblock may be coded according to eight basic modes:
 intra; frame DCT,
 intra; picture DCT,
 without motion compensation (noMC); frame DCT,
 without motion compensation (noMC); picture DCT,
 with motion compensation; prediction by earlier frames; frame DCT,
 with motion compensation; prediction by earlier frames; picture DCT,
 with motion compensation; prediction by earlier picture; frame DCT,
 with motion compensation; prediction by earlier picture; picture DCT.

For the pictures of B type, 14 basic coding modes are possible, namely two intra-coding modes, the four modes with motion compensation indicated with regard to the pictures of P type and, in addition, four similar coding modes based on the later prediction picture and 4 bidirectional modes, namely:
 prediction by later frames; frame DCT,
 prediction by later frames; picture DCT,
 prediction by later picture; frame DCT,
 prediction by later picture; picture DCT,
 frame-wise bidirectional prediction; frame DCT,
 frame-wise bidirectional prediction; picture DCT,
 picture-wise bidirectional prediction; frame DCT,
 picture-wise bidirectional prediction; picture DCT.

It has been noted that the criteria used hitherto to choose between these various modes for the P and B pictures gave results of variable quality.

In the earlier patent application Ser. No. 98 10802 filed on Aug. 28, 1998 in the name of THOMSON Multimedia, a compression process was described, in which a trial coding was performed according to all possible modes, or according to some of these modes, and for each trial coding, the coding cost and/or a quality factor is/are determined, the mode of coding used being selected as a function of the value of the coding cost and/or of the value of the quality factor.

Stated otherwise, according to the process described in the earlier application, the coding mode is not chosen as a function of an internal analysis of the macroblocks, but by trying all the coding possibilities (or some of them) and by adopting the mode which gives the best result, either because it minimizes the coding cost, or because it maximizes the quality of the picture, or because it provides the best compromise between coding cost and picture quality.

This process provides optimal results for each macroblock, especially when a given cost/quality criterion is chosen. However, it is difficult to apply in respect of a coding which has to be performed in real time, since it involves a considerable calculation time which is difficult to reduce, especially for portable apparatuses.

Nevertheless, this coding in accordance with the earlier application has been used to determine parameters which can be calculated in real time and which make it possible to select the modes of coding which provide the best results in the case of P and B pictures.

SUMMARY OF THE INVENTION

According to a first aspect of the invention, to determine the mode of coding the macroblocks of the P and/or B pictures, one calculates, for each coding mode, an energy parameter which, for the inter-coding modes, is the inter-picture energy and for the intra-coding modes is the relative energy with respect to the average value of luminance and one adopts the coding mode which provides the minimum energy parameter or a coding mode providing an energy parameter which does not exceed this minimum energy parameter by more than a predetermined factor k. In one example, the factor k is equal to 2.5.

DETAILED DESCRIPTION OF PREFERRED EMBODIMENTS

Figure 1:
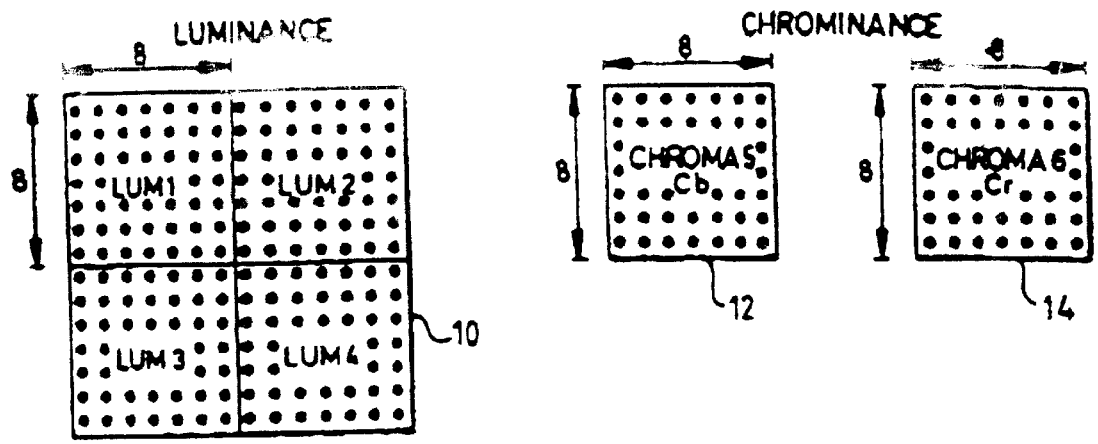
FIG. 1 represents four 8×8 luminance blocks
Figure 2:
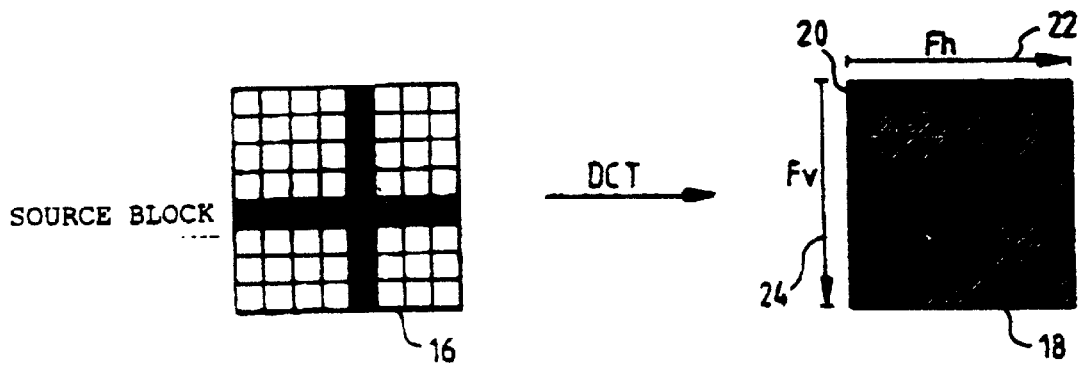
FIG. 2 represents a source block which is transformed
Figure 3:
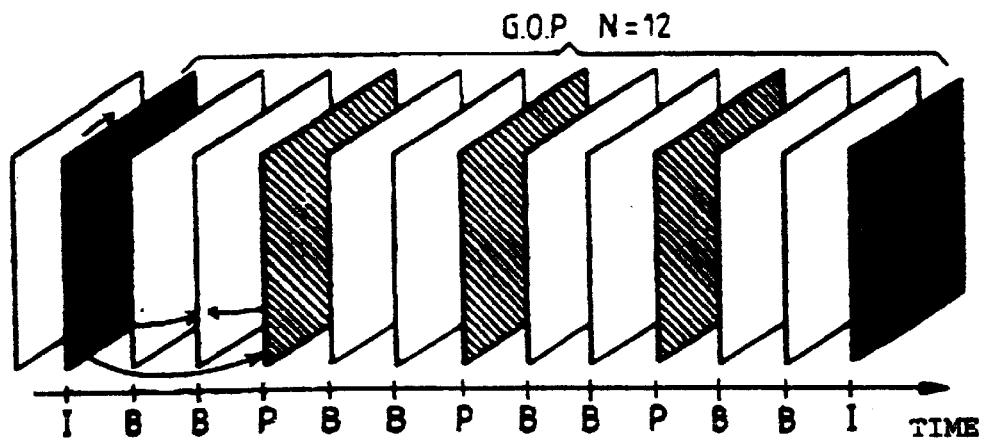
FIG. 3 represents a group of pictures
Figure 4A:
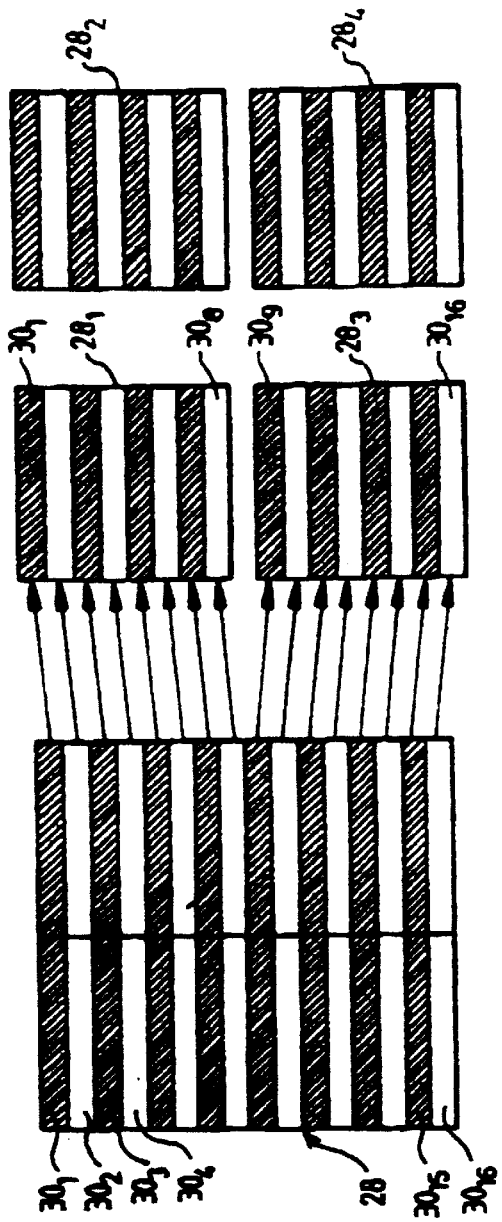
FIG. 4 represents the different kinds of blocks to be coded
Figure 4B:
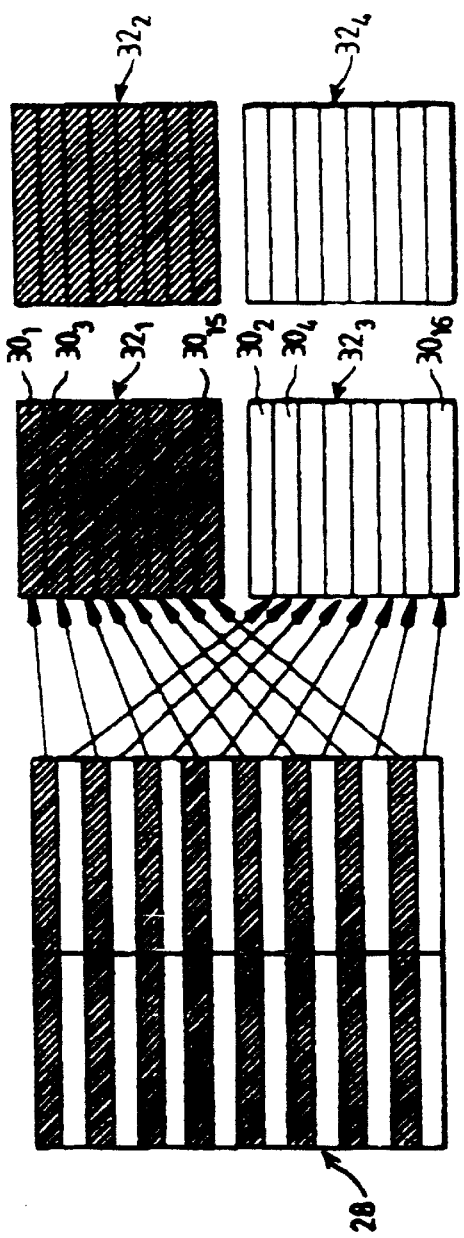
Figure 5:
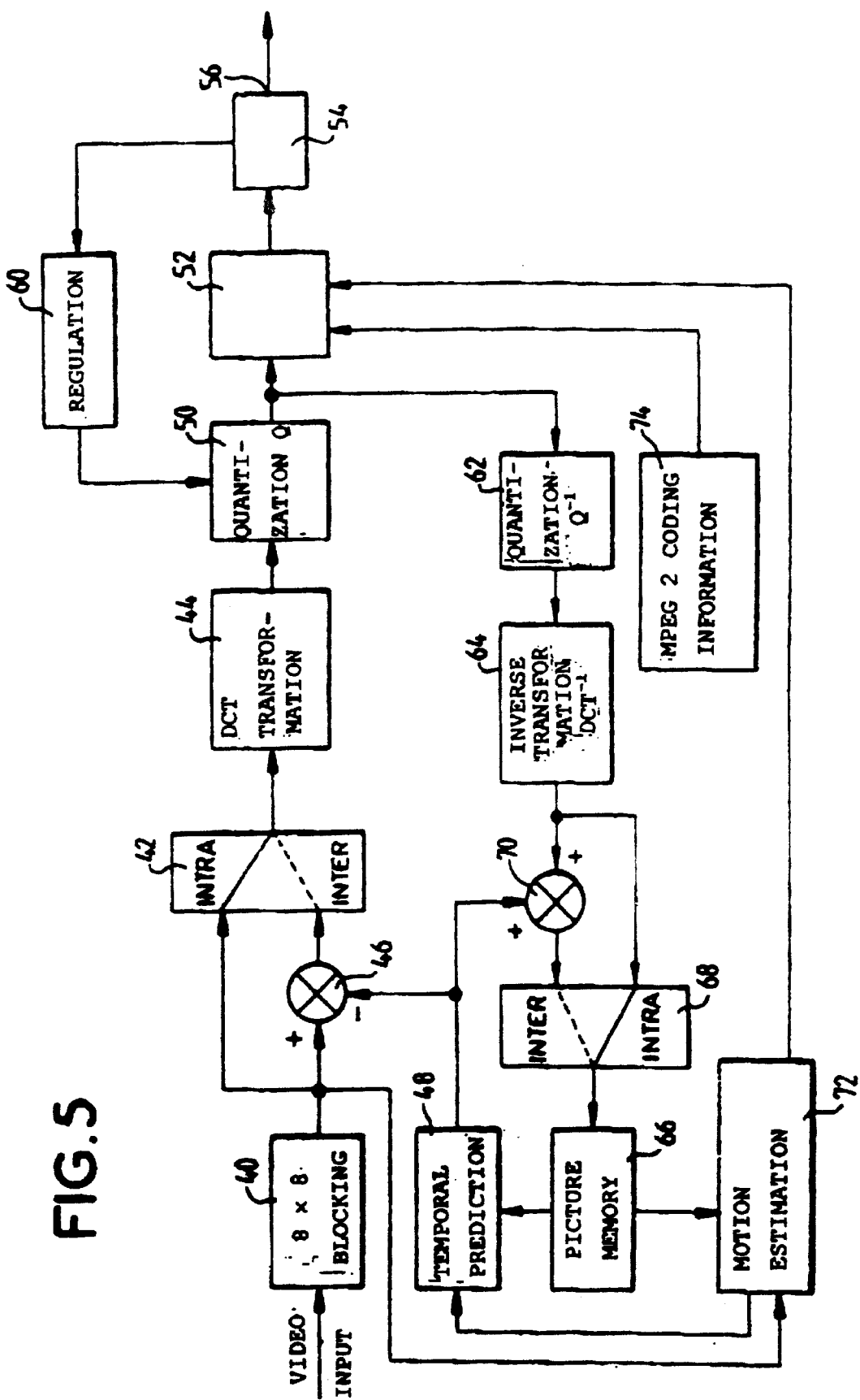
FIG. 5 represents a device for video compression.

In the case of inter macroblocks, the inter-picture energy $MB_{dfd}$ has the value:

$$MB_{dfd} = \left( \sum_{i,j=0}^{i,j=15} |e(i,j)| \right) \quad (1)$$

In this formula, e(i,j) represents the prediction error, i represents the row number in the macroblock and j represents the column number in this macroblock.

In the case of an intra-coding mode, the relative energy can be determined by calculating, for each 8×8 block, the sum of the absolute values of the differences between the luminances x(i,j) of the pixels of the blocks and the average value (bl.avr.lum.) of the luminance of the block, that is to say:

$$MB_{dfd} = \sum_{4 \text{ lums blocks}} \left( \sum_{i,j=0}^{i,j=7} |x(i,j) - bl.avr.lum| \right) \quad (2)$$

The average value bl.avr.lum is determined both in picture coding mode and in frame coding mode.

It should be noted that it is already known practice to utilize the parameter $MB_{dfd}$ in the case of inter macroblocks. However, the inventors have discovered that the parameter $MB_{dfd}$ as defined above by formula (2) could be employed for the intra-coding modes. Stated otherwise, to determine the coding mode, a new parameter is utilized.

This new parameter $MB_{dfd}$ can also be used to select between the frame DCT mode and the picture DCT mode. It is known that in order to determine the choice between the picture DCT mode and the frame DCT mode, the local activity of the macroblock is compared in picture mode and in frame mode, and one chooses the mode which provides the lowest local activity. The invention makes it possible to optimize selection when the picture and frame local activities are equal. In this case, the energy parameters $MB_{dfd}$ as defined above are compared and one chooses the picture or frame DCT coding mode for which the parameter $MB_{dfd}$ is the smaller.

Finally, if the picture and frame parameters $MB_{dfd}$ are equal, a picture DCT coding will preferably be performed.

It is recalled that the local activity is defined as follows:

$$MB\_activ = \sum_{4 \text{ luma blocks}} Block\_activ$$

with $$block\_activ = MAX\left( \underset{i,j=0}{\overset{i=6,j=7}{MAX}} |x(i,j) - x(i+1,j)|, \underset{i,j=0}{\overset{i=7,j=6}{MAX}} |x(i,j) - x(i,j+1)| \right)$$

In these formulae, x(i,j) and i and j have the meanings indicated above. However for the predicted modes, MB_activ is calculated over the macroblock of prediction errors.

According to another characteristic of the invention, which can be used independently of the characteristics defined above, the following parameter is determined for all possible modes of coding the P and B pictures:

$$MB\_activ - \alpha\_Q,$$

and one chooses the coding mode which minimizes this parameter.

MB_activ is the local activity of the macroblock, Q represents the quantization interval and a is a coefficient which depends on parameters for weighting the quantization matrix. In one example, this parameter a is equal to 1.

By virtue of the subtracting of the value $\alpha\_Q$ from MB_activ the quantity (MB_activ−$\alpha\_Q$) provides an estimate of the potential cost of the macroblock in question. Indeed, for determined MB_activ, the higher the quantization interval Q, the lower will be the cost of the macroblock, since fewer coefficients will be adopted in the quantization routine.

In fact, in the quantization routine, the MPEG2 coding standard uses a quantization interval Q and a so-called weighting matrix (of size 8×8 corresponding to that of the DCT) for the DCT coefficients which, in general, makes it possible to reduce the amplitude of the high-frequency coefficients. Thus the DCT coefficient c(i,j) is quantized by dividing its amplitude by the product of the quantization interval Q times the value of the corresponding coefficient p(i,j) of the weighting matrix.

Generally the inter- and intra-picture weighting matrices are not identical. Moreover, the content of these matrices is not specified by the standard; it can therefore vary as a function of the specification of the coders.

The value 1 has been chosen for α within the context of a set of intra and inter weighting matrices as follows:

| Intra matrix m_intra_1 | | | | | | | | Inter matrix m_inter_1 | | | | | | | |
|---|---|---|---|---|---|---|---|---|---|---|---|---|---|---|---|
| 08 | 16 | 16 | 19 | 16 | 19 | 22 | 22 | 16 | 17 | 17 | 19 | 18 | 19 | 20 | 20 |
| 22 | 22 | 22 | 22 | 26 | 24 | 26 | 27 | 20 | 20 | 22 | 21 | 22 | 21 | 22 | 23 |
| 27 | 27 | 26 | 26 | 26 | 26 | 27 | 27 | 23 | 24 | 23 | 24 | 23 | 25 | 25 | 26 |
| 27 | 29 | 29 | 29 | 34 | 34 | 34 | 29 | 25 | 26 | 24 | 25 | 26 | 26 | 27 | 27 |
| 29 | 29 | 27 | 27 | 29 | 29 | 32 | 32 | 28 | 27 | 27 | 26 | 28 | 29 | 29 | 30 |
| 34 | 34 | 37 | 38 | 37 | 35 | 35 | 34 | 29 | 29 | 28 | 31 | 31 | 32 | 31 | 32 |
| 35 | 38 | 38 | 40 | 40 | 40 | 48 | 48 | 30 | 33 | 34 | 33 | 34 | 33 | 36 | 35 |
| 46 | 46 | 56 | 56 | 58 | 69 | 69 | 83 | 36 | 35 | 38 | 39 | 38 | 41 | 40 | 43 |

On the other hand, in the configuration of the following matrices:

| Intra matrix m_intra_1 | | | | | | | | Inter matrix m_inter_2 | | | | | | | |
|---|---|---|---|---|---|---|---|---|---|---|---|---|---|---|---|
| 08 | 16 | 16 | 19 | 16 | 19 | 22 | 22 | 16 | 16 | 16 | 16 | 16 | 16 | 16 | 16 |
| 22 | 22 | 22 | 22 | 26 | 24 | 26 | 27 | 16 | 16 | 16 | 16 | 16 | 16 | 16 | 16 |
| 27 | 27 | 26 | 26 | 26 | 26 | 27 | 27 | 16 | 16 | 16 | 16 | 16 | 16 | 16 | 16 |
| 27 | 29 | 29 | 29 | 34 | 34 | 34 | 29 | 16 | 16 | 16 | 16 | 16 | 16 | 16 | 16 |
| 29 | 29 | 27 | 27 | 29 | 29 | 32 | 32 | 16 | 16 | 16 | 16 | 16 | 16 | 16 | 16 |
| 34 | 34 | 37 | 38 | 37 | 35 | 35 | 34 | 16 | 16 | 16 | 16 | 16 | 16 | 16 | 16 |
| 35 | 38 | 38 | 40 | 40 | 40 | 48 | 48 | 16 | 16 | 16 | 16 | 16 | 16 | 16 | 16 |
| 46 | 46 | 56 | 56 | 58 | 69 | 69 | 83 | 16 | 16 | 16 | 16 | 16 | 16 | 16 | 16 |

One chooses a parameter value α used for the inter-picture coding modes which is less than 1, for example 0.875. This is because the matrix m_inter_2 allows through many more DCT coefficients than the matrix m_inter_1. In this configuration it may therefore be regarded that:

in intra-picture modes α=α_intra=1, in inter-picture modes α=α_inter=0.875

In one embodiment, in intra-coding mode, if, for a block, the parameter block_activ−α.Q is less than a given level, then this parameter block_activ−α.Q will be given a default value corresponding, for example, to a quarter of the minimum cost of an intra-coded macroblock. Indeed, a macroblock coded in intra mode cannot be of zero cost, unlike in the case of the inter-picture modes. The actual minimum cost of a block corresponds to the coding cost of the average value of the block (DC) and of a code representing the end of the block. Thus:

in the 4.2.0 coding configuration the estimate of the minimum cost of the block is brought to bl_intra_420_min (for example bl_intra_420_min=11), in the 4.2.2 coding configuration the estimate of the minimum cost of the block may be brought to bl_intra_422_min (for example bl_intra_422_min=15), These minimum values can, of course, vary substantially as a function of the type of VLC tables used, for coding the coefficients, the length of whose end-of-block code varies moreover. The essential feature of this approach is that it is inconceivable to have an intra macroblock of zero cost.

In the preferred embodiment of the invention, a combination of the abovementioned criteria is used, proceeding in the following manner, for the P and B pictures:

The minimum value of the parameter $MB_{dfd}$, i.e. $MB_{dfd}$min, is determined for each macroblock from among all the possible modes of coding (intra included), and one selects the coding modes for which:

$MB_{dfd} < k.MB_{dfd}$min, k being a predetermined factor which, in one example, is equal to 2.5.

To determine the type of DCT (frame or picture), one proceeds as indicated above, that is to say one considers the local activity parameter MB_activ and one chooses the picture or frame DCT depending on whether the picture or frame MB_activ parameter is the smaller and if these two parameters are equal, the picture or frame DCT is chosen depending on whether the picture or frame $MB_{dfd}$ parameter is the smaller. In the case of equality of the parameters $MB_{dfd}$, the picture DCT is chosen.

Finally, to select the coding mode to be adopted from among the coding modes which are still candidates, the following parameter is considered:

$$Val=(MB\_activ-\alpha.Q).MB_{dfd}/MB_{dfd}min+Hdr\_MB \qquad (3)$$

and one chooses the coding mode which provides the minimum value of this parameter Val.

In this formula (3), Hdr_MB represents the sum of all the parameters of the header of a macroblock with the exception of the parameter CBP (Coded Block Pattern). The latter is a variable-length code making it possible to indicate to the decoder the distribution of the blocks containing coefficients, given that, in inter-picture mode, certain blocks may be empty. Indeed, all the parameters of the header can be determined before the coding, with the exception of the parameter CBP. This parameter can be replaced by a predetermined value in Hdr_MB.

The length of the CBP code for a 4.2.0 macroblock (4 luminance blocks, 2 chrominance blocks) varies according to the table of VLC codes, from 3 to 9 bits. The predetermined value can be 4 for example. In the 4.2.2 standard (4 luminance blocks, 4 chrominance blocks) this value will be slightly higher (6 for example).

For all useful purposes, it is recalled here that the header of a macroblock comprises the following parameters: an MBA address code (Macroblock Address) which represents the relative address of the macroblock with respect to the last macroblock coded; the mode of coding; the value of the quantization interval; the type of DCT (picture or frame); and the vectors.

Regarding this last point, it will be noted that the cost of the vectors is generally greater in frame mode than in picture mode since, in the first case (frame), twice as many vectors must be provided as in the second (picture). However, the coding cost in frame mode is not necessarily higher than in picture mode, since the coding of the vectors is performed differentially with respect to the latest vectors transmitted.

Preferably, in formula (3) above $MB_{dfd}$ is assigned a weighting factor thd which is equal to 1 in the case of an inter-coding mode and which is greater than 1 in the case of an intra-coding mode, this weighting factor being able to exhibit different values, determined empirically, depending on whether one is dealing with a P picture or a B picture.

This weighting factor conveys the fact that the cost of coding a macroblock in intra mode is generally greater than the cost of coding a macroblock in inter mode.

If MB_activ−α.Q=0, the macroblock may be empty and uncoded.

In this case, in any event, the parameter val is limited to the cost of the header Hdr_MB.

Moreover, in the situation where the macroblock is estimated as being potentially empty and hence uncoded (still in inter-picture mode), one considers the configuration of the omitted macroblock (SKIPPED MACROBLOCK). This configuration corresponds to two specific cases:

In the case of a P picture, the macroblock is empty, hence uncoded and the coding mode is noMC, the so-called uncompensated mode (in reality this vector is zero by default).

The second case is that of a B picture: the macroblock is empty, hence uncoded, and the motion vectors are identical to those previously transmitted.

For an omitted macroblock, no information is transmitted in respect of the relevant macroblock.

Thus, with this parameter val, one tries, among other things, to best discern the empty blocks which make it possible to gear up towards uncoded macroblocks, or even omitted macroblocks, doing all of this for the sake of a reasonable cost/quality ratio within the context of an "a priori" approach, that is to say one which can be set up in real time.

It should be noted that, conventionally, for pictures of intra type, one has to choose solely between frame DCT coding and picture DCT coding. For this purpose, the parameter MB_activ is utilized and one chooses the frame or picture coding mode depending on whether the frame or picture MB_activ parameter is a minimum.

Experience has shown that, regardless of the embodiment of the invention, this picture compression process makes it possible, as compared with the previously known processes, to reduce the coding cost for equal quality or to increase the quality for constant coding cost.

In a general manner, the invention provides a picture compression process, especially of the MPEG2 type, in which each picture macroblock 10 is subjected to a coding chosen, for each macroblock, from among several types of coding. In order to select the type of coding to be applied to the macroblock, the following parameter is determined: MB_activ−α_Q, in which formula:

MB_activ has the following value $$MB\_activ = \sum_{\substack{4 luma \\ blocks}} Block\_activ$$

with $$\text{block\_active} = \text{MAX}\left(\underset{i,j=0}{\overset{i=6,j=7}{\text{Max}}} |x(i,j) - x(i+1,j)|, \underset{i,j=0}{\overset{i=7,j=6}{\text{MAX}}}|x(i,j) - x(i,j+1)|\right),$$

Q is the quantization interval and

α is a predetermined parameter, the mode of coding selected being that which corresponds to a minimum value of the said parameter MB__activ-α__Q.

According to one embodiment, the coefficient α is equal to 1.

Furthermore, the value of α can be made to depend on the content of the weighting matrices used in the procedure for quantizing the DCT coefficients.

According to one embodiment of this arrangement, in intra- (or inter-) picture mode α=1, the weighting matrix used in inter- (or intra-) picture mode performing a lower weighting than in intra (or inter) mode, the coefficient α used in inter- (or intra-) picture mode is smaller than 1.

According to one embodiment, for each block (16), in intra-coding mode, a predetermined value is given to block__activ-α__Q when this parameter drops below a determined threshold.

The predetermined value corresponds to a quarter of the minimum cost of an intra-coded macroblock.

According to one embodiment, it is possible to favour the "skip macroblock" coding by weighting the calculated values val, in the cases where the macroblock is estimated as being potentially empty. These cases are explained on page 14, line 12 et seq.:

in the case of a P picture, the coding mode is noMC, the so-called uncompensated mode (in reality this vector is zero by default).

in the case of a B picture, the motion vectors are identical to those previously transmitted, that is to say used by the last macroblock coded.

According to a variant of the invention, the value of Hdr__MB in the expression for val is weighted by a variable "Context":

val=MB__activ\*MB__dfd/MB__dfd__min+Hdr__MB\*Context

This variable has the value:
1) If MB__val__avg≦threshold__val__avg and MB__mean__activ≦threshold__mean__activ Context=(MB__val__avg/256)\*(MB__mean__activ/16)
   The thresholds mentioned are predefined thresholds.
2) Otherwise Context=1

This weighting therefore depends on two parameters:

the average activity of the source macroblock:

This value makes it possible to take into account the context by evaluating the average activity of the macroblock to be coded. It is calculated in the following way:

$$\text{MB\_mean\_activ} = \sum_{\substack{4 luma \\ blocks}} \text{block\_activ}/4$$

the average luminance value of the source macroblock:

As in the case of the average activity, this information serves to evaluate the context within which the current macroblock lies, so as to optimize the decision criterion. This average value is calculated over the luminance blocks only:

$$\text{MB\_val\_moy} = \frac{\left(\sum_{i=0}^{15}\sum_{j=0}^{15} \text{MB\_src}(i,j)\right)}{256}$$

MB__src(i,j) corresponding to the luminance of pixel (i,j) in macroblock MB.

More generally, the chosen weighting is proportional to the average luminance value of the source macroblock and inversely proportional to the average activity of this source macroblock. This makes it possible to take account of the activity of the macroblock and also of the average luminance of this macroblock.

In the case of a uniform macroblock, that is to say for a small value of MB__activ, or else in the case where the quantization interval is large, the expression MB__active-alpha Q is small compared with the cost of the header. The algorithm then tends to favour the prediction modes based on an earlier picture or frame or based on a later picture or frame to the detriment of the frame or picture bidirectional prediction modes for which the cost Hdr__MB is higher.

Now, the bidirectional prediction mode averages the prediction error and improves subjective quality. This is why, in the case where the average activity and the average luminance value of the source macroblock are below a predetermined threshold, by virtue of this weighting of the cost of the header, the value of the parameter val will be decreased for the bidirectional prediction mode, so as to favour this mode, that is to say the choice of DFDmin.

It is in the cases where there is low average activity of the macroblock and low average luminance that the block effects are most visible, since uniform dark zones are then present. The weighting is then performed so as to favour the bidirectional coding which makes it possible to limit this type of artefact.

If the average activity of the macroblock is high or at least greater than a predefined threshold, textured zones are then present and the block effects are less visible and it is then unnecessary to favour the bidirectional mode (Context=1). It should be pointed out here that it is indeed the average activity of the macroblock which is taken into account for the weighting and not the activity of the macroblock, since this may be high even if only one or some pixels have a large disparity in luminance in relation to the other pixels of the macroblock.

What is claimed is:

1. Picture compression process, especially of the MPEG2 type, in which each picture macroblock (10) is subjected to a coding chosen, for each macroblock, from among several types of coding using coding modes such as inter or intra, frame or field, backward or forward motion compensation, characterized in that in order to select the type of coding to be applied to the macroblock, the following parameter is determined for all possible modes of coding: MB__activ-α__Q, in which formula:

MB__activ corresponds to the energy or activity of the macroblock,

Q is the quantization interval and

α is a predetermined parameter, wherein the mode of coding selected being the mode corresponding to the minimum value of said parameter MB__activ-α__Q.

2. Process according to claim 1, characterized in that the activity of the macroblock is defined by the following value:

$$MB\_activ = \sum_{\substack{4luma \\ blocks}} block\_activ,$$

with:

$$block\_active = MAX\left(\max_{\substack{i,j=0}}^{i=6,j=7} |x(i,j) - x(i+1,j)|, \max_{\substack{i,j=0}}^{i=7,j=6} |x(i,j) - x(i,j+1)|\right),$$

in which formula x(i,j) represents the luminance of the point in row i and column j of each block.

3. Process according to claim 1, characterized in that the value of α is different for inter mode and for intra mode.

4. Process according to claim 1 characterized in that the coefficient α is equal to 1.

5. Process according to claim 1, characterized in that the value of α is made to depend on the content of the weighting matrices used in the procedure for quantizing the DCT coefficients.

6. Process according to claim 5, characterized in that in intra- (or inter-) picture mode α=1, and in that the weighting matrix used in inter- (or intra-) picture mode performing a lower weighting than in intra (or inter) mode, the coefficient α used in inter- (or intra-) picture mode is smaller than 1.

7. Process according to claim 2, characterized for each block (16), in intra-coding mode, a predetermined value is given to block_activ–α_Q when this parameter drops below a determined threshold.

8. Process according to claim 1, characterized for each block (16), in intra-coding mode, a predetermined value is given to block_activ–α_Q when this parameter drops below a determined threshold.

9. Process according to claim 7, characterized in that the predetermined value corresponds to a quarter of the minimum cost of an intra-coded macroblock.

10. Process according to claim 1, characterized in that the selection of the mode of coding is also dependent on the cost of coding the header Hdr_MB for the relevant coding.

11. Process according to claim 10, characterized in that the cost of coding the header does not take into account the CBP parameter for the inter-coding modes.

12. Process according to claim 11, characterized in that the CBP parameter is replaced by a predetermined value dependent on the standard of the picture to be coded.

13. Process according to claim 10, characterized in that the mode of coding selected, from among the various modes of coding, is the one which provides a parameter val of smallest value, this parameter corresponding to expression:

$$Val = (MBactiv - \alpha.Q) * MB_{dfd}/MB_{dfd}\min + Hdr\_MB,$$

in which formula MB_activ represents the activity of a macroblock, Q represents the quantization interval, α is a constant coefficient, Hdr_MB is a parameter representing the cost of coding the header for the relevant mode of coding, $MB_{dfd}$ represents an energy parameter for the macroblocks, this parameter $MB_{dfd}$ having the following value for the inter codings:

$$MB_{dfd} = \left(\sum_{i,j=0}^{i,j=15} |e(i,j)|\right), \quad (1)$$

in which formula i and j represent the row number and the column number of each point and e(i, j) represents the luminance prediction error for the corresponding point, the energy parameter having the following value in intra mode:

$$MB_{dfd} = \sum_{\substack{4lums \\ blocks}} \left(\sum_{i,j=0}^{i,j=7} |x(i,j) - bl.avr.lum|\right),$$

in which formula x(i,j) represents the luminance of the point in row i and column j of each block and bl.avr.lum represents the average value of luminance for each of these blocks.

14. Process according to claim 10, characterized in that the parameter $MB_{dfd}$ is assigned a higher coefficient for the intra-coding modes than for the inter-coding modes.

15. Process according to claim 14, characterized in that the coefficient assigned to the parameter $MB_{dfd}$, in the case of the intra mode, depends on the P or B nature of the picture to be coded.

16. Process according to claim 10, characterized in that a value MB_activ is assigned by default to the quantity MB_activ–α.Q when the latter drops below a predetermined threshold.

17. Process according to claim 16, characterized in that the default value corresponds to a quarter of the minimum cost of coding an intra-coded macroblock.

18. Process according to claim 10, characterized in that the picture or frame DCT coding mode is chosen as a function of the value of the local activity, the DCT coding mode selected corresponding to that for which the local activity is the smaller and, in the case of equality, the frame and picture energy parameters $MB_{dfd}$ are compared and that for which the parameter $MB_{dfd}$ is the smaller is chosen.

19. Process according to claim 18, characterized in that the picture DCT mode is selected in the case of equality of the parameters $MB_{dfd}$.

20. Process according to claim 13, characterized in that the value val is bounded below by a predetermined value when the probabilities of having to code a "skipped macroblock" are large, that is to say if, for a picture of P type, one is in the so-called uncompensated "no MC" coding mode or if, for a picture of B type, the motion vectors are identical to those used by the last macroblock coded.

21. Process according to claim 13, characterized in that the term Hdr_MB is weighted in the expression for "val" when the average activity of a source macroblock $$MB\_mean\_activ = \sum_{\substack{4luma \\ blocks}} block\_activ/4$$

and its average value $$MB\_val\_moy = \frac{\left(\sum_{i=0}^{15}\sum_{j=0}^{15} MB\_src(i,j)\right)}{256}$$

in which expression MB_src(i,j) corresponds to the luminance of pixel (i,j) in macroblock MB, are below predetermined thresholds, so as to favour the bidirectional prediction mode.

22. Process according to claim 21, characterized in that the weighting is proportional to the average value of the source macroblock and inversely proportional to the average activity of this source macroblock.

* * * * *